April 6, 1943.　　　M. ESNARD　　　2,315,948
VALVE STEM FOR FAUCETS
Filed Dec. 3, 1941
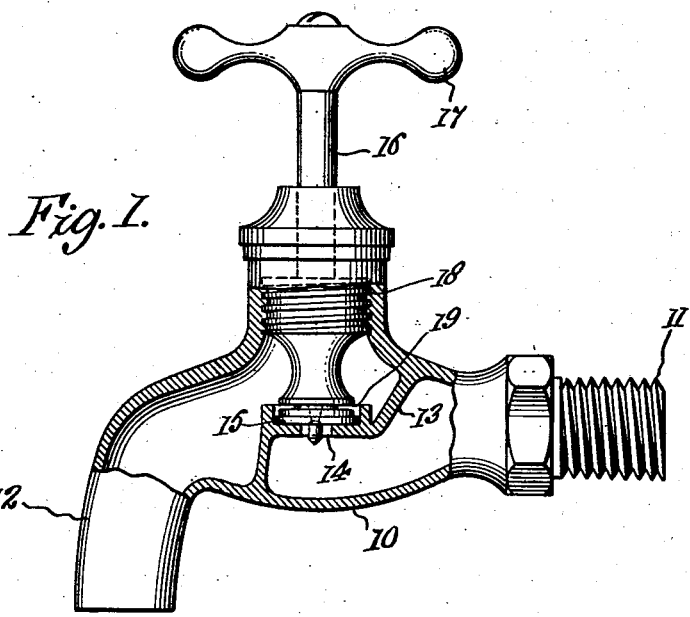
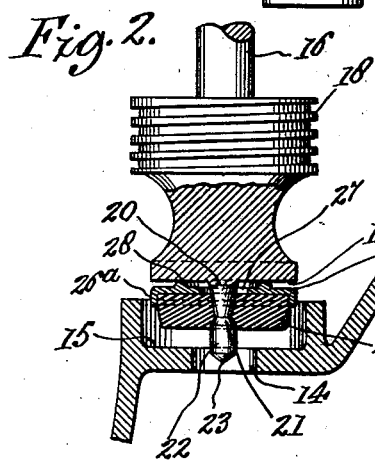
Inventor
*M. Esnard*
*Wilkinson & Mawhinney*
Attorneys.

Patented Apr. 6, 1943

2,315,948

UNITED STATES PATENT OFFICE 2,315,948

VALVE STEM FOR FAUCETS

Miguel Esnard, Matanzas, Cuba

Application December 3, 1941, Serial No. 421,505

10 Claims. (Cl. 251—160)

The present invention relates to faucets, and more particularly to a novel construction of valve body for use in the faucets and for directly supporting a washer thereon.

In faucet construction it has been heretofore considered necessary to bore an opening in the bottom or inner end of the valve body, thread or otherwise condition the opening for the reception of a separate stem, and to provide a separate stem structure with a backing plate and other parts for supporting a washer either detachably, or renewable with the stem and backing plate or the like.

It is an object of this invention to reduce the cost of manufacture and sale of these faucet parts as well as to provide a structure wherein the stems, backing plates and the like need not be renewed but wherein the washer may be directly mounted upon the valve body and quickly removed or substituted relative thereto when necessary in renewing the washer.

It is also an object of this invention to provide a structure of this character wherein the parts are at all times maintained in true alinement with the valve body and valve seat, and to accomplish the objects of the invention with a construction which considerably reduces the number of operations required for its manufacture, the number of parts which are necessary to make up the structure, and also reduces the liability of accumulation of waste between the relatively detachable parts which impair their seating and operation.

The invention has for a further object improvements in the washer and its cap member without regard to whether the same are held on the valve body by an integral or threaded stud; and in certain improvements in the stud, in combination with the washer such improvements being without regard to the integrality or separability of the stud.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation of a faucet embodying the features of the present invention, parts being broken away and in section to show the valve body therein.

Figure 2 is a fragmentary enlarged sectional view taken through the valve seat and the valve body with a washer thereon, the parts being in relative open position.

Figure 3 is a fragmentary perspective view, with parts shown in section, of a form of improved cap member employed.

Figure 4 is a similar view of an improved form of washer employed.

Figure 5 is a view similar to Figure 2 but showing a modification in which the stud is detachable instead of integral.

Figure 6 is a view similar to Figure 5 wtih the valve in the closed position, and Figure 7 shows in sectional perspective the stud, washer and cap member assembly of Fig. 5.

Referring now to the drawing, 10 designates the casing or shell of the faucet which is provided in the usual manner with a spud or nipple 11 for connection with a water supply pipe, and which has at its outer end the usual delivery spout 12.

The casing 10 of the faucet is provided at an intermediate point with the usual diaphragm 13 through which is provided a port 14 surrounded by a valve seat 15.

The valve body is mounted in the casing 10 in line with the valve seat 15 and comprises a stem 16 to the upper end of which is secured a suitable handle 17. At an intermediate point the stem 16 is provided with a tap or head 18 which is threaded in a suitable extension of the casing 10 and by means of which the stem is moved toward and from the valve seat 15 in the operations of closing and opening the faucet. The lower end of the stem 16, or the inner end thereof, is enlarged and flattened to provide a backing face or plate 19 which is of less diameter than that of the tap 18 so that the lower end of the stem may freely pass through the threaded extension of the casing 10. The lower end of the stem 16 is proportioned to closely approach the valve seat 15, and the backing face or plate 19 is adapted to support directly thereagainst the renewable washer structure.

Projecting downwardly from the central portion of the backing plate 19 is a washer supporting shank 20 which tapers slightly downward and merges into a tapering shoulder 21 provided upon the upper end of a washer retaining head 22, the latter terminating at its lower end in a conical point 23.

Detachably engaging over the retaining head 22 and upon the shank 20 is a washer 24 of rubber, or other suitable material or composition, which has the necessary inherent resiliency to seal the valve seat 15 when the valve is closed, and also to engage over the head 22 and upon the shank 20. The washer 24 has a central opening 25 normally of a diameter less than that of the shank 20. The washer 24 may be reinforced by a cap 26 fitting over the upper end of the washer 24 and extending but a short distance downwardly about the outer marginal edge of the washer so that the upper end of the washer is maintained in compressed position under compression while the lower portion of the washer is free to expand and to seal the valve seat when closed.

The washer 24 with its cap 26 comprises a washer unit which may be sold independently for substitution upon the valve body as the washers are worn, and to place the washer with its cap 26 upon the lower end of the valve body, the cap 26 is provided with a central opening 27 which is of larger diameter than the head 22 so that the cap will offer no resistance in passing over the head and will permit the washer 24 to expand at its inner marginal edge, about the opening 25, over the head 22 of the valve body.

The cap 26 is preferably of metal possessing substantial rigidity and having a flange 26ᵃ depending from the outer circular margin thereof to partially envelop the perimeter of the washer 24 which is a disc.

The upper surface of the cap 26 is preferably made with a circular rib 28 upstanding therefrom in position to space the upper face of the cap 26 from the backing face 19. Where the two faces 26 and 19 come in flat contact throughout their respective surface areas maximum friction is undesirable as tending to cause the cap and upper part of the washer 24 to rotate with the valve body 18, particularly after the valve body has descended sufficiently to jam the lower portion of the washer 24 non-rotatively against the valve seat 15.

The rib 28 may be semi-circular in cross section to produce only a substantial line contact with the backing 19, which line contact is the minimum theoretically obtainable. In this way friction between these parts is reduced to a minimum.

The washer 24 is forced upwardly over the conical point 23 and over the head 22, and is further forced upwardly against the backing face 19 and upon the tapering shank 20. As shown clearly in Figure 2, the shank 20 and the tapering shoulder 21 are so proportioned in length relative to the thickness of the washer 24 and its cap 26 that the washer will inherently contract about and bind upon the shank and shoulder so that the washer is held from axial movement upon the valve body and is maintained with a tight seat at all times thereon.

It will be noted that with this construction there are no loosely connected or sliding parts and consequently the valve will be quiet in action and there will be less likelihood of wear upon the washer and the other parts of the valve during the operation and use of the same.

As to the manufacture of the valve body, the same may be made in one piece with the backing face or plate 19 and the shank 20 with its head 22. No boring or threading at the lower end of the valve body is required and consequently in renewing a washer there is no screw to remove and no tools are required as the washer may be easily forced by hand over the head 22. The old washer may be quickly detached, therefore, and a new washer quickly forced over the head 22 into position on the valve body. This construction considerably reduces the actual costs in operations and parts in the manufacture, and also the cost of handling valve parts for renewing when worn. Furthermore, the interchange of washers on the valve body requires no special skill or tools and the repair of leaky faucets may be easily accomplished by practically anyone.

Referring more particularly to Figures 5, 6 and 7, a modified form is shown in which the stud or shank 20ᵃ is detachable instead of integral with the valve body; in which the stud is formed with the threaded shank 29 adapted to removable fit within a threaded socket 30 of the valve body, said stud having a downwardly tapered neck or shank portion 31 terminating in a shoulder 32 above an enlarged conical or part spherical head 33 in which is made a cross-cut 34. The other parts are the same and are similarly numbered.

Figure 7 shows the reinforce washer as a separate assembly with the cap plate 26 and stud 20ᵃ. In this form the walls of the narrow opening 25 of washer 24 tightly hung the tapering shank 31, the lower face of the washer 24 engaging the shoulder 32, thus serving to hold the rubber or other elastic washer 24 upon the stud. The washer will of course hold its cap plate 26 in place.

In the form shown in Figures 1 to 4 inclusive the cap plate 26 and washer 24 form the independent unit which may be sold separately from the valve stem and mounted thereon in a manner hereinafter described. The contact between cap 26 and the valve stem is restricted to the circular line of the rib 28. As this rib is circular in plan it engages the face 19 at opposite diametric points all around the axis of the stud or shank and thus prevent rocking of the washer and its cap assembly upon the stud or upon the surface 19. In faucets without stems the screw construction 29 are useful. The cross-cut 34 will receive a screw driver or other tool whereby the screw shank 29 may be screwed into and out of the threaded socket 30.

For faucets with integral stems the brass cap and rubber washer only need be purchased. For all others the purchasable assembly is shown in Figure 7.

It is obvious that various changes and modifications may be made in the details of construction and design of the above specifically described embodiment of this invention without departing from the spirit thereof, such changes and modifications being restricted only by the scope of the following claims.

What is claimed is:

1. A valve member for faucets having valve seats, comprising a stem adapted to be mounted in a faucet for movement toward and from the valve seat, said stem having a flat lower end portion providing a backing plate and having an integral axial shank extending below the backing plate and terminating in an enlarged head, said shank having mounted thereon above the head a washer of resilient material having a central opening of a diameter less than that of the shank and a reinforcing cap fitting over the upper portion of the washer and having a central opening of larger diameter than the head of the shank for free passage of the reinforcing cap thereover, said head having a tapering shoulder at its upper end engaging the lower portion of the washer to yieldingly hold the same and said reinforcing cap upwardly against said backing plate.

2. A valve body for faucets having a valve seat, comprising a stem mounted in the faucet for movement toward and from the valve seat and having a flattened inner end portion providing a backing plate, said stem also having an integral axial shank projecting below the backing plate and terminating in an enlarged head, a flexible washer having a relatively small central opening therethrough compressibly fitting about the shank against the upper end of the head, and a reinforcing cap having a central opening of a size to receive said enlarged head therethrough fitting over the upper portion of the washer and engaging said backing plate to reinforce the washer and maintain the upper portion thereof against spreading beyond the marginal edge of the cap.

3. A device according to claim 1 in which the cap is provided with means of small surface area for engaging the stem to maintain frictional contact at a minimum.

4. A device according to claim 1 in which the reinforcing cap is provided with an outstanding rib for engaging the backing plate, said rib being substantially circular in plan and semi-circular in cross section.

5. In a faucet having a valve seat and a valve body movable toward and from said seat and having a socket therein, a detachable stud mounted in said socket and projecting below the valve body and having a downwardly tapering portion and a shouldered head, a resilient washer having an opening smaller in diameter than the smallest diameter of the tapering portion of the stud and being mounted over the enlarged head and engaging against the shoulder, and a reinforced cap interposed between said washer and the valve body.

6. A device according to claim 5 in which the stud and socket are screw threaded and in which the head has a cross cut.

7. A device according to claim 5 in which the reinforced cap has a rib of limited superficial extent for engaging the adjacent face of the valve body.

8. A valve assembly for faucets comprising a stem having a flat lower end portion, a shank extending below the flat end portion and terminating in an enlarged head, a washer of resilient material having an opening therethrough of less diameter than that of said shank, and a flanged cap member of substantially rigid material fitted over the upper portion and part of the perimeter of the washer and having an opening therein of a diameter greater than the diameter of said enlarged head and substantially coaxial with the washer opening, said cap member engaging the flat lower end portion of said stem, and said washer compressibly fitting about the shank against the upper end of the head.

9. A device according to claim 8 in which the cap member is formed with an upstanding rib substantially semi-circular in cross-section.

10. As an article of commerce and sale, an assembly comprising a stud, a resilient washer detachably engaging said stud, and a flanged cap plate fitting over and partly about said washer, said stud being tapered and shouldered with the washer having an opening to receive the stud of smaller diameter than the tapered and shouldered portions, and in which the cap has a rib circular in plan and semi-circular in cross-section upstanding therefrom.

MIGUEL ESNARD.